Feb. 9, 1960 W. R. SEIGLE 2,924,195
REMOTE CONTROLLED COLOR-CODING APPARATUS
Filed Feb. 20, 1957 4 Sheets-Sheet 1

INVENTOR:
WILLIAM R. SEIGLE,
BY *Hugo M. Wikstrom*
HIS ATTORNEY.

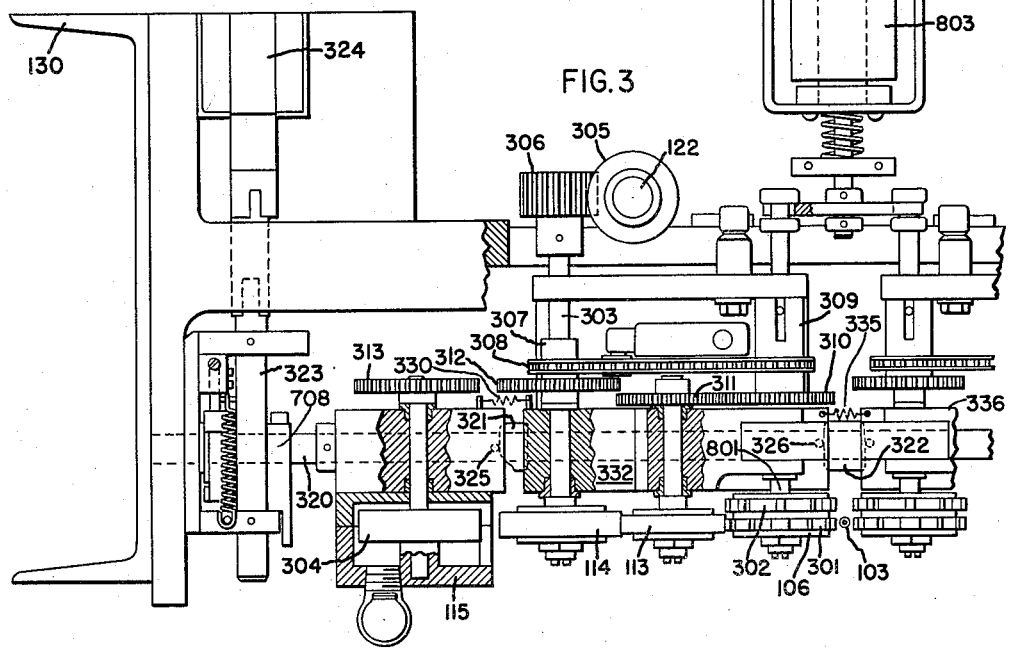

Feb. 9, 1960 W. R. SEIGLE 2,924,195
REMOTE CONTROLLED COLOR-CODING APPARATUS
Filed Feb. 20, 1957 4 Sheets-Sheet 3
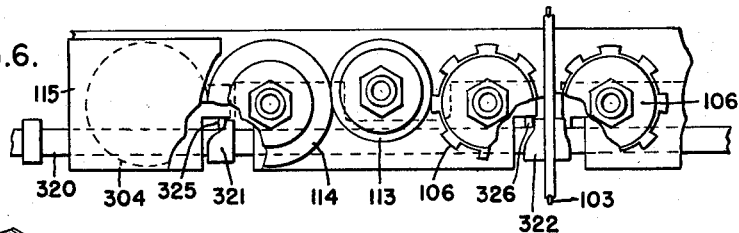
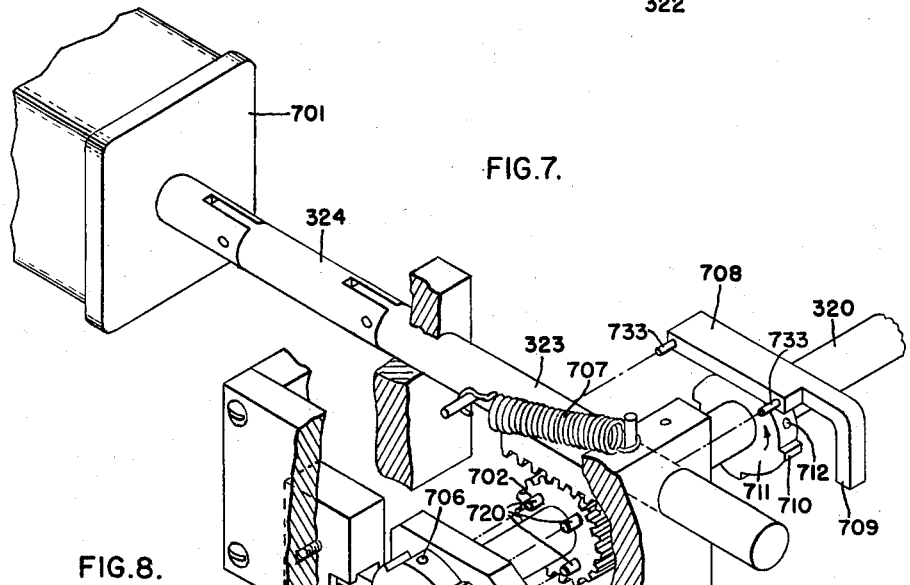
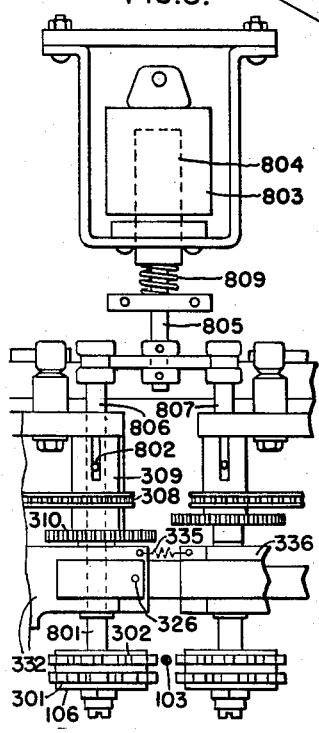
INVENTOR:
WILLIAM R. SEIGLE,
BY Hugo M. Wikstrom
HIS ATTORNEY.

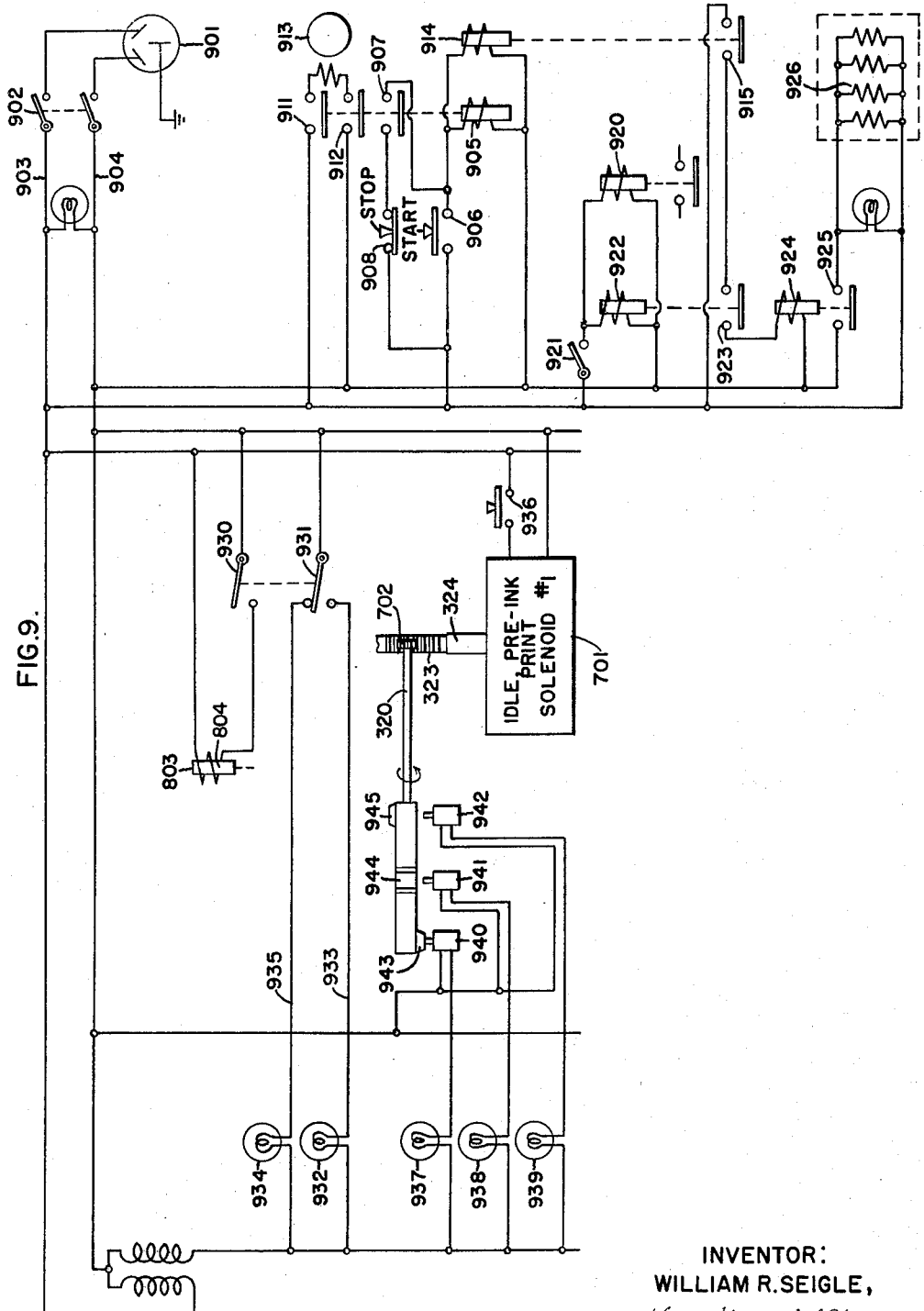

United States Patent Office 2,924,195
Patented Feb. 9, 1960

2,924,195

REMOTE CONTROLLED COLOR-CODING APPARATUS

William Robbins Seigle, New Hartford, N.Y., assignor to General Electric Company, a corporation of New York Application February 20, 1957, Serial No. 641,337

7 Claims. (Cl. 118—9)

This invention relates to the art of wire color coding and more particularly to the art of selectably distinguishable color markings to the insulation of wire.

The recent increase in complexity in electronic equipment, coupled with modern assembly techniques such as cabling of interconnecting wiring, has made imperative the use of a color code on wire insulation to facilitate tracing interconnecting paths in this equipment. This need has been recognized in the prior art, and, as a result, interconnecting wire has been marked with distinguishing color combinations. The color code has usually taken the form of a base color on the insulation of the wiring upon which is superimposed a thin tracer color different from that of the base color. Tracing of individual interconnecting paths is facilitated by suitably selecting the base and tracer color to provide a non-ambiguous combination.

To supply non-ambiguous combinations for complex equipment, many different color combinations have been required. This requirement has created a serious problem in inventory control, particularly since the demand for specific combinations is variable.

It is, therefore, one object of my invention to eliminate the inventory control problems found in the prior art by providing a novel method and means for color coding insulated wire in only those lengths needed for the specific equipments being produced.

It is a further object of my invention to provide a method and means for color coding selected lengths of insulated wire in accordance with signals from a remote position.

It is a further object of my invention to provide a method and means for applying a base and a tracer color to insulated wire in a novel pattern.

In one embodiment of my invention, I have provided a plurality of printing head pairs having selectable patterns on each head. Each pair is associated with a different color and is movably positioned astraddle standard white insulated wire. The selection of the pattern and the movement of each head pair into printing engagement with the insulated wire is controlled remotely. Thus the wire can be color coded in any selectable length from a remote position.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings, in which:

Figure 2 is a plan view of the wire color coded by the apparatus in Figure 1;

Figure 3 is a partly cross-sectioned view of a portion of the apparatus shown in Figure 1;

Figure 4 is a partly cross-sectioned view of a portion of the apparatus shown in Figure 1;

Figure 5 is a partly cross-sectioned view of a portion of the apparatus shown in Figure 1;

Figure 6 is a partly cross-sectioned view of a portion of the apparatus shown in Figure 1;

Figure 7 is an exploded perspective view of a portion of the apparatus shown in Figure 3;

Figure 8 is a plan view of a portion of the apparatus shown in Figure 3; and

Figure 9 is a circuit diagram of a portion of the apparatus shown in Figure 1.

Figure 1:
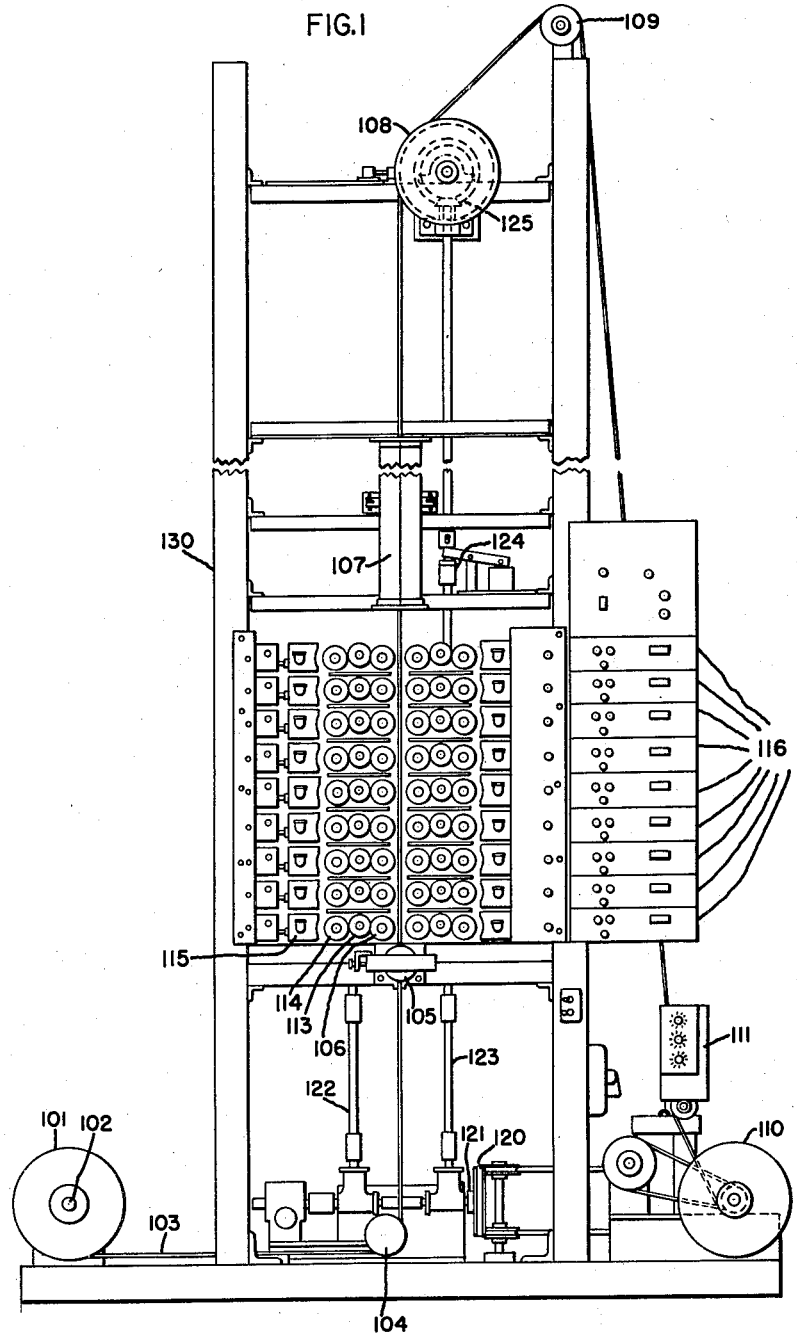
Figure 1 is a plan view of one embodiment of my invention.

In Figure 1 there is shown a standard reel of insulated wire 101, rotatably mounted on shaft 102. The wire is plain white insulated wire upon which is to be imprinted the color code by the printing apparatus. The wire 103 is properly oriented for printing by pulley 104. An automatic tensioner 105 is provided to maintain tautness in the wire as it passes a plurality of printing heads 106 which are adapted to apply the color coding to the wire. The wire imprinted with the proper color code is drawn through a drying oven 107 by drive pulley 108. The color coded wire is then fed over pulley 109 to a take-up reel 110 after passing through a measuring device 111, which measures the length of wire imprinted with a specific color code.

Associated with each printing head are two ink transfer rolls 113 and 114. The ink transfer rolls selectably coat the appropriate printing head with ink from reservoir 115. The selection of the appropriate color for the base and the tracer marking is remotely controlled from the control panel 116. The ink transfer rolls are held apart from the reservoirs, and the printing heads are held away from the wire until the selection of color and printing operation are made from control panel 116. Each printing head is equipped with two separate printing patterns, one for the base color and the other for the tracer color. Selection of the pattern to be printed is also remotely controlled from the control panel 116.

Power to drive the assembly is derived from a motor (not shown) which drives the belt 120, pulley 121 and shafts 122 and 123 through appropriate gearing. Shaft 123 drives the wire drive pulley 108 through a clutch member 124 and the beveled gear 125. To prevent smearing of the ink when the printing heads engage the wire, the printing heads' rotational speed is synchronized with wire speed by appropriate power takeoff from shafts 122 and 123 which controls the wire drive pulley 108. A frame 130 supports the assembly.

In Figure 2 is shown a section of wire having the usual conductor 201 and insulator 202 color coded by the apparatus of Figure 1. The base color is imprinted in a long band 203 with the tracer color printed in a narrow band 204. As will be evident to those skilled in the art, the color of both the broad and the tracer bands can be changed to provide many nonambiguous color combinations to facilitate tracing of interconnecting wiring in electronic equipment. The operation of printing heads and the inked distribution rollers may best be understood by reference to Figure 3.

In Figure 3 is shown the frame member 130. The printing roll 106 carrying the base pattern printing head 301 and the tracer pattern printing head 302 is rotatably supported by shaft 801. To transport ink from the reservoir 115 a pickup roller 304 is rotatably immersed in the ink. The ink coating on the roller 304 is transported to the printing head by rollers 113 and 114 when in contact with roller 304. The movement of the roller 304 into contact with roller 114, and the movement of one of the printing heads into contact with the wire is selectably made. By means of this selectable engagement, coupled with the selectable engagement of the printing head with the wire, I provide means for controlling the color imprinted on the wire and the length of wire so marked. The method of selection will be explained in greater detail in a later portion of the specification.

In order to synchronize rotation of the printing roll with wire movement, shaft 122, which controls the wire feed rate, provides power for rotation of the printing head through a plurality of worm gears 305 and spur gears 306. Rotation of spur gear 306 drives the printing head through the sprocket 307, chain 308, and sprocket 309. Gears 310 and 311 are provided to properly drive ink feedroll 113. Similarly, gears 312, mounted on shaft 303, and 313, when enmeshed, synchronize the rotation of the feed roll 114 and the pickup roller 304.

To prevent inking of the printing rolls which are not in use, in addition to accurately controlling the marked length of the wire by movement of the printing head, I have provided shaft 320 carrying cams 321 and 322. The shaft is rotated in 90° increments by the action of rack 323 which is moved by shaft 324. Shaft 324 could be a solenoid operated plunger well known to the art.

In the idle position, shown in Figures 3 and 4, the reservoir is held away from the feed rolls by the action of pin 325 on cam 321. Similarly the printing head is held away from the wire by the action of pin 326 on cam 322.

When a color selection is made, the shaft 320 is rotated 90°, as shown in Figure 5. The rotation of the cam allows the pin to drop into a depression on the cam. The reservoir then moves laterally and ink is supplied to the transfer rolls by the pickup roll. The reservoir is moved towards the transfer rolls by the action of spring means illustrated as a tension spring 330 secured between the reservoir 115 and the carriage 332.

To engage the printing head with the moving wire, shaft 320 is rotated 90° more by the solenoid as shown in Figure 6. This further rotation will allow pin 326 to move into a depression on the cam surface 322. The entire printing assembly comprising the transfer rollers and printing rollers all secured to the carriage 332, moves into contact with the wire by the action of spring means in the form of a tension spring 335 secured between carriage 332 and carriage 336, on which are mounted the transfer and printing rollers disposed on the opposite side of the wire 103. Since the printing head is rotating at a speed corresponding to the speed of the wire travelling past it, the engagement of the printing head with the wire is made smoothly and without creating blurs or blots on the wire.

The operation of the solenoid operated rotator for shaft 320 can best be seen by reference to Figure 7. In Figure 7 is shown shaft 320 which is rotated to select idle position, pre-ink position, and the printing position of the roller assembly. The rack 323 is affixed to shaft 324 which is energized by solenoid 701. When solenoid 701 is energized, shaft 324 is retracted, moving gear 702 which is engaged with the rack 323. Gear 702 is free to rotate about shaft 320 and has pinned to it by pins 720 a plate 703 carrying pawl 704 which engages notches on the racheted wheel 705. The wheel 705 is pinned to shaft 320 by pin 706, but is movable with respect to the plate 703. A return spring 707 is provided to pull the rack 323 and plate 703 back to the initial position whereupon pawl 704 falls into a subsequent notch readying the apparatus for subsequent movement. To allow rapid selection, the solenoid plunger speed is usually maintained high. However, this creates the danger of overshooting the desired shaft position. To prevent such overshoot, I have provided a stop 708, which is affixed to the rack 323 by pins 733 and travels with rack 323. The stop is provided with a cam engaging surface 709 which engages the appropriate cam stop surface 710 on the disk 711 which is pinned to shaft 320 by pin 712. The stop is moved out of the way when the rack returns to the end of the stroke.

As mentioned in connection with Figure 1, I have provided patterns on the printer roll for applying both the base color and the tracer color to the wire as it moves through the printing apparatus. The operation of selection is best shown in Figure 8. In Figure 8 there is shown the printer roll 106 having a base color pattern 301 and a tracer color pattern 302. The roller is mounted on shaft 801 which is movable within shaft 309 and is keyed thereto by key 802. In this manner, rotation of the shafts is keyed together, but shaft 801 can move within shaft 309. When it is desired to print the tracer color, coil 803 is energized, retracting plunger 804, which, through shaft 805, pulls shafts 806 and 807 out. This action aligns the tracer pattern 302 with the wire 103. When the coil 803 is de-energized, spring 809 will return the assembly so that the base color is aligned with the wire. The selection of the desired selection operations may best be understood by reference to Figure 9.

In Figure 9 there is shown the power source 901. Power from the source is supplied to the apparatus over leads 903 and 904 when switch 902 is closed. Power is fed to relay 905 through the momentary contact start switch 906. When relay 905 closes, power is supplied through holding contactor 907 and the normally closed stop switch 908. The closure of contactors 911 and 912 associated with relay 905 supply power to the drive motor 913. Connected in parallel with relay 905 is relay 914, the contactor 915 of which prevents closing of the oven unless power to drive the wire is available.

The wire drive clutch (124, Figure 1) is operated by the wire drive solenoid 920 which is powered from leads 903 and 904 through switch 921. Relay 922, in parallel with solenoid 920, operates through contactor 923 to prevent oven door operation unless the wire drive is engaged. It has been found advantageous to have moveable doors on the oven (107, Figure 1) closed by operation of solenoid 924. By this operation protection against excessive heating of the stopped wire is prevented by the circuitry, including contactors 923 and 915. When the oven doors are properly closed, a switch 925 supplies power to the oven heating coils 926.

Power for the pattern selector solenoid 803 is supplied when switch 930 is closed. Associated contactor 931 supplies power to the signal lamp 932 over lead 933 and removes it from lamp 934 supplied over lead 935.

The selection of idle, pre-ink, and printing position is made by supplying power through momentary contact 936 to solenoid 701. Contact 936 may be closed manually or by remote control to energize solenoid 701 for the length of time necessary to print color for the selected length on the wire 103. As explained in connection with Figures 3, 4, 5, and 6, the solenoid 701 rotates the shaft each time the solenoid is energized. To indicate the position of the shaft, lamps 937, 938 and 939 respectively indicating idle, pre-ink and print, are respectively energized through contacts 940, 941 and 942. The contacts are respectively closed by cams 943, 944, 945 on the shaft 320.

While particular embodiments of the present invention have been shown and described, it will be obvious to those skilled in the art that changes and modifications may be made without departing from the invention in its broader aspects, and, therefore, the aim in the appended claims is to cover all such changes and modifications that fall within the true spirit and scope of the invention.

I claim:

1. Apparatus for printing selectable lengths of a coil of insulated wire with non-ambiguous combinations of base and tracer bands of different colors comprising means for drawing said wire from said coil and through said apparatus, means for measuring the length of wire drawn through said apparatus, a plurality of movably mounted reservoir means, each of said reservoir means containing ink of a different color, a rotatably and movably mounted base band printing roller associated with each of said reservoirs, a rotatably and movably mounted tracer band printing roller associated with each of said reservoirs, rotatably and movably mounted ink transfer rollers associated with each of said reservoir means for selecting a desired base band color comprising means for simultaneously aligning with said wire and placing in contact with said ink transfer rollers the base printing roller associated with said desired color, means for selecting a desired tracer color comprising means for simultaneously aligning with said wire and placing in contact with said ink transfer rollers the tracer printing roller associated with said desired color, means for inking said tracer printing roller comprising means for moving said desired color reservoir into contact wtih its associated ink transfer rollers and means for rotating said printing roller and said ink transfer rollers, means for inking said base printing roller comprising means for moving said desired color reservoir into contact with its associated ink transfer rollers and means for rotating said printing roller and said ink transfer rollers, means for printing said base band comprising means for driving said base band printing roller in contact with said wire without separation from said ink transfer roller, means for printing said tracer band comprising means for driving said tracer band printing roller in contact with said wire without separation from said associated ink transfer roller, means for separating said base band printing roller from said wire when a selected length of wire has been imprinted, means for separating said tracer band printing roller from said wire when a selected length of wire has been imprinted, and means for drying said printed length.

2. Apparatus for color coding selectable lengths of insulated wire with base and tracer bands of different colors comprising means for drawing said wire through said apparatus, a plurality of printing assemblies, each of said assemblies comprising a pair of base pattern printing rollers rotatably and movably mounted astraddle said wire in a first position out of contact with said wire, a pair of tracer pattern printing rollers rotatably movably mounted in first position displaced from and out of contact with said wire, a pair of movably mounted ink transfer means, each of said transfer means contacting one of said pair of base pattern printing rollers, and a pair of reservoirs containing ink of one of said different colors, each of said reservoirs associated with one of said transfer means and moveably mounted in a first position out of contact with said means, means for selecting the tracer band color comprising means for moving the tracer pattern printing rollers associated with the desired color from said first position to a position astraddle said wire and in contact with said ink transfer means, means for preparing said selected tracer pattern rollers for printing comprising means for moving the associated reservoirs from said first position to a position contacting said ink transfer means, means for simultaneously selecting the desired base band color and preparing one of said base pattern rollers for printing comprising means for moving the reservoirs containing the desired base color from said first position to a position contacting said associated ink transfer means, and means for printing said lengths of wire with base and tracer bands of said selected colors comprising means for measuring the length of wire drawn through said apparatus, means for rotating said base pattern printing rollers and said tracer pattern printing rollers at a speed synchronized with the wire speed, means for positioning said tracer pattern roller with respect to said base pattern roller to print separate bands, means for moving said selected base and tracer pattern printing rollers into printing engagement with said wire, and means for drying said printed bands.

3. Apparatus for color coding insulated wire in nonambiguous combinations of base and tracer bands of different colors comprising means for drawing said insulated wire through said apparatus; a plurality of movably mounted printing assemblies; each of said printing assemblies comprising movably mounted ink reservoir means containing one of said different colors, means for printing a base band, means for printing a tracer band only between said base bands, said base band printing means normally aligned with said wire, means for selecting the desired tracer color comprising means for displacing said base band printing means from said normal position and aligning said tracer band printing means with said wire, and means for transferring ink from said reservoir means to said aligned printing means, said reservoir means normally positioned out of contact with said ink transfer means; means for preparing the rollers associated with the desired colors for printing comprising means for moving the reservoirs containing the desired colors in contact with the associated ink transfer means; means for printing said selected lengths comprising means for measuring the lengths of wire driven through said apparatus, and means for moving the printing assemblies containing said selected colors so that said prepared rollers contact said wire; and means for drying said printed bands.

4. In combination, a plurality of printing assemblies, means for drawing wire from a reel to a take-up spool past said printing assemblies, each of said printing assemblies comprising movably mounted reservoir means, movably mounted ink transfer means, a movably mounted base pattern printing roller, a movably mounted tracer pattern printing roller, said base pattern printing roller being movably positioned adjacent said wire and in contact with said ink transfer means, means responsive to a first signal for simultaneously displacing said base pattern printing roller from position adjacent said wire and for positioning said tracer pattern printing roller adjacent said wire and in contact with said ink transfer means, means responsive to a second signal for moving said reservoir means into contact with said transfer means, means responsive to a third signal for moving said reservoir means, ink transfer means, and the printing roller so that said roller contacts said wire in printing engagement therewith, and means for printing selected lengths of said wire with desired base pattern and tracer pattern colors comprising means for measuring the length of wire drawn past said printing assemblies, and remotely selectable means for applying said first, second and third signals to each of said plurality of printing assemblies.

5. In combination, a plurality of printing assemblies, means for drawing wire from a reel to a take-up spool past said printing assemblies, each of said printing assemblies comprising movably mounted ink reservoir means, movably mounted ink transfer means, a base pattern printing roller, a movably mounted tracer pattern printing roller, said base pattern printing roller being movably positioned adjacent said wire and in contact with said ink transfer means, means responsive to a first signal for simultaneously displacing said base pattern printing roller from position adjacent said wire and for positioning said tracer pattern printing roller adjacent said wire, and in contact with said ink transfer means, means responsive to a second signal for moving said reservoir means into contact with said ink transfer means, means responsive to a third signal for moving said printing roller into printing engagement with said wire, and means for printing selected lengths of said wire with desired base pattern and tracer pattern colors comprising means for measuring the length of wire drawn past said printing assemblies, remotely selectable means for applying said first, second, and third signals to said printing assembly containing ink of the desired tracer pattern color, and remotely selectable means for applying said second and third signals to said printing assembly containing ink of the desired base pattern color.

6. In apparatus for color coding selectable lengths of insulated wire, the combination comprising movably mounted ink reservoir means, a rotatably and movably mounted pattern printing roller positioned adjacent said wire, ink transfer means in contact with said roller, means responsive to a first signal for moving said reservoir into ink transferring engagement with said ink transfer means, means responsive to a second signal for moving said roller into printing engagement with said wire, and remotely selectable means for generating said first and second signals.

7. In apparatus for color coding insulated wire, the combination comprising a movably mounted base pattern printing roller, movably mounted ink transfer means in contact with said roller, movably mounted ink reservoir means, a movably mounted tracer pattern printing roller, means responsive to a first signal for simultaneously moving said base pattern printing roller out of contact with said ink transfer means and for moving said tracer pattern printing roller into contact with said ink transfer means, means responsive to a second signal for moving said ink reservoir means into contact with said ink transfer means, and means for remotely selecting the color coding comprising means for selectably applying said first and second signals.

References Cited in the file of this patent

UNITED STATES PATENTS

| | | |
|---|---|---|
| 2,211,792 | Rohland | Aug. 20, 1940 |
| 2,344,610 | Hargreaves et al. | Mar. 21, 1944 |